United States Patent
Swanepoel et al.

(10) Patent No.: US 6,521,003 B2
(45) Date of Patent: Feb. 18, 2003

(54) TREATMENT OF SOLID CARBONACEOUS MATERIAL

(75) Inventors: Jacobus Swanepoel, Pretoria (ZA); Ruan Lombaard, Pretoria (ZA); Julian Charles Mast-Ingle, Durban (ZA)

(73) Assignees: Sasol Technology (Pty) Limited, Johannesburg (ZA); Thermiron Scientific OC, Pretoria (ZA)

( * ) Notice: Subject to any disclaimer, the term of this patent is extended or adjusted under 35 U.S.C. 154(b) by 0 days.

(21) Appl. No.: 09/794,314

(22) Filed: Feb. 27, 2001

(65) Prior Publication Data

US 2001/0047614 A1 Dec. 6, 2001

Related U.S. Application Data

(63) Continuation of application No. PCT/IB99/01477, filed on Aug. 26, 1999.

(30) Foreign Application Priority Data

Sep. 2, 1998 (ZA) ............................................. 98/8028

(51) Int. Cl.[7] ................................................. C10L 3/00
(52) U.S. Cl. ........................... 44/620; 48/210; 204/164
(58) Field of Search ...................... 44/620, 621; 48/210; 204/164

(56) References Cited

U.S. PATENT DOCUMENTS

| 4,472,172 A | * | 9/1984 | Sheer et al. ................... 48/202 |
| 4,487,683 A | * | 12/1984 | Bozzuto ...................... 208/8 R |
| 4,571,259 A | | 2/1986 | Fey et al. .................... 75/10 R |

FOREIGN PATENT DOCUMENTS

| DE | 2428549 | | 8/1995 |
| GB | 2160219 | * | 12/1985 |
| WO | 9317759 | | 9/1993 |

* cited by examiner

*Primary Examiner*—Cephia D. Toomer
(74) *Attorney, Agent, or Firm*—Ladas & Parry

(57) ABSTRACT

A process and an installation for treating solid carbonaceous material comprises heating the material to a temperature of about 1800° C. or higher, by means of a non-transfer arc generated plasma flame. This causes components of, or present in, the carbonaceous material to be gasified and thus to be separated or removed from any residual solid material as a hot gas phase, with residual solid material being obtained as a product. The installation comprises a vertical shaft non-transfer arc plasma reactor comprising an upper preheating zone (14) an intermediate reaction zone (16) in which at least one non-transfer arc plasma generator or reactor (40) is located and a lower cooling zone (18).

18 Claims, 1 Drawing Sheet

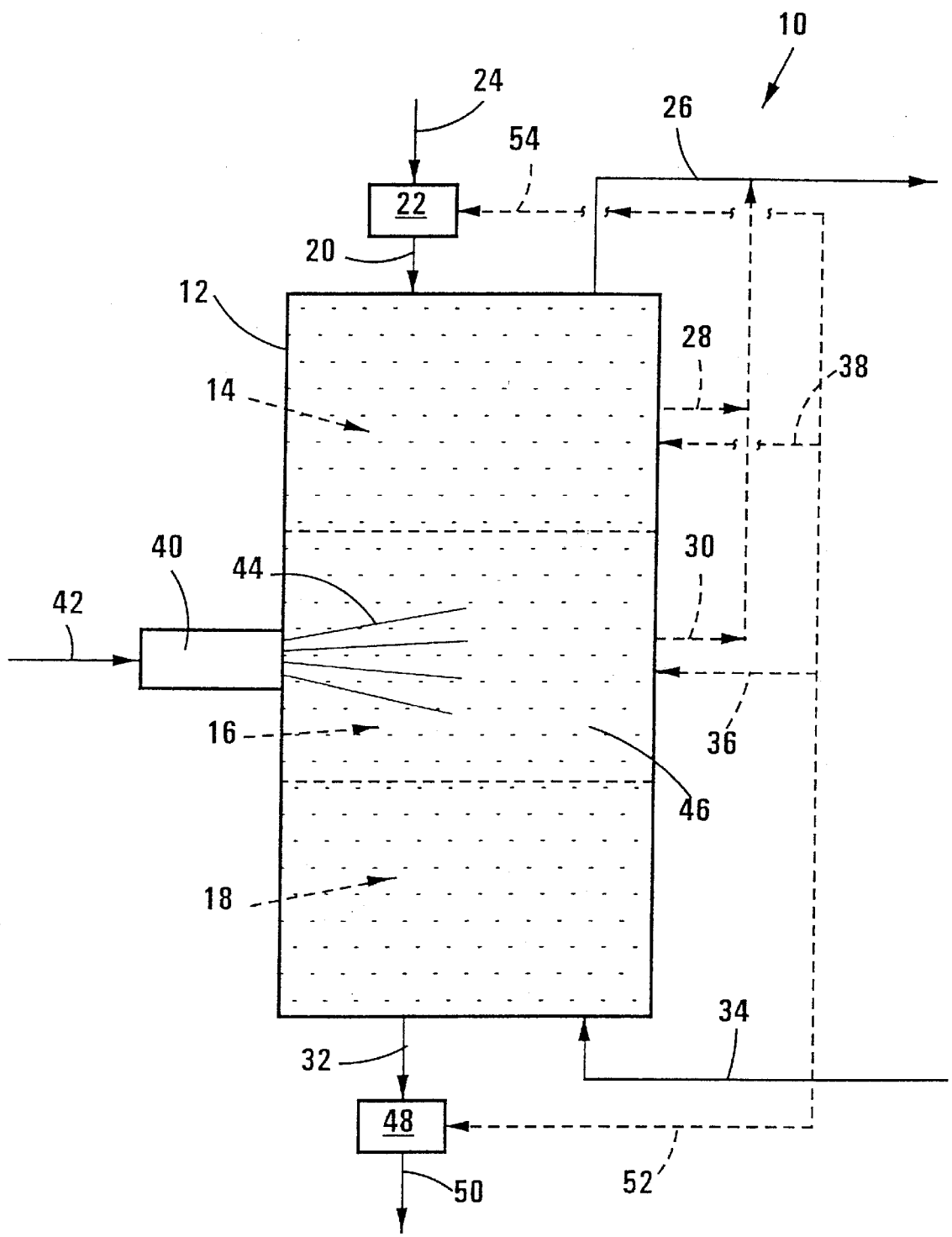

TREATMENT OF SOLID CARBONACEOUS MATERIAL

This application is a continuation of PCT/IB99/01477, filed Aug. 26, 1999.

This invention relates to the treatment of solid carbonaceous material. It relates in particular to a process and installation for treating solid carbonaceous material.

SUMMARY OF INVENTION

According to a first aspect of the invention, there is provided a process for treating solid carbonaceous material, which process comprises heating the material to a temperature of about 1800° C. or higher, by means of a non-transfer arc generated plasma flame, thereby causing components of, or present in, the carbonaceous material to be gasified and thus to be separated or removed from any residual solid material as a hot gas phase, with said any residual solid material being obtained as a product.

The non-transfer arc plasma flame is thus that produced by a non-transfer arc plasma generator or torch comprising an anode and a cathode between which an arc is generated while a gaseous medium passes between the anode and the cathode. The gaseous medium is heated by the arc, typically to a temperature in excess of 3000° C., so that molecules of the gas split into atoms which become ionized and electrically conducting. The non-transfer arc generated plasma flame thus comprises the hot ionized gaseous medium, i.e. a plasma, and an elongate electric arc inside the plasma. The heating may be effected in a high temperature reaction zone in which the plasma generator or torch is located.

The solid carbonaceous material may be in particulate form, and may be present in the reaction zone in the form of a bed, such as a fixed or moving bed. The process may be a batch process. However, it is envisaged that the process will normally be a continuous process in which the bed of solid particulate material passes continuously through the reaction zone. More particularly, the bed of solid carbonaceous material may pass continuously through the reaction zone in a vertically downward direction, with fresh solid particulate carbonaceous material being added continuously to the top of the bed, and solid particulate product, when present, being withdrawn continuously from the bottom of the bed.

The process may include adding fresh solid particulate carbonaceous material to a preheating zone located above the reaction zone, and heating the carbonaceous material in the preheating zone by contacting it with the hot gas phase from the reaction zone. Thus, in the preheating zone, the feedstock may be heated from ambient or room temperature to a temperature of about 1800° C., or higher.

The addition of the fresh solid particulate carbonaceous material to the top of the bed may be at such a rate that the bed moves through the reaction zone at a rate of from 10 mm/min to 90 mm/min, preferably from 40 mm/min to 70 mm/min.

The process may include cooling any residual solid material or solid product in a cooling zone below the reaction zone. The cooling may be effected by contacting the hot solid product with a treatment gas. The treatment gas may thus enter the cooling zone, cool down the hot solid product while it is heated, pass upwardly from the cooling zone into and through the reaction zone, and thereafter into and through the preheating zone. The hot gas phase then comprises spent or used treatment gas, gasified components from the solid carbonaceous material, and any gaseous products formed in the reaction zone.

The treatment gas may be reactive or non-reactive, depending on the solid carbonaceous material used.

The entire flow of treatment gas may thus be introduced through the cooling zone. However, in one embodiment of the invention, a portion of the treatment gas may be introduced directly into the reaction zone, eg directly with the plasma flame, as part of the plasma generating gas. In other words, at least a portion or component of the gaseous medium of the non-transfer arc generated plasma flame may be treatment gas. In this embodiment of the invention, about a third of the total treatment gas required in the reactor, may then enter as part of the plasma generating gas.

The treatment gas may be selected from: an inert gas such as argon, helium and neon; a relatively inert gas such as nitrogen; a more reactive gas such as oxygen; a gas which is liquid at ambient conditions, such as superheated steam, which can then typically be at a temperature in the range of 1000° C. to 1800° C.; a synthesis gas such as a hydrogen-carbon monoxide mixture; a halogen such as chlorine or fluorine; and a mixture of two or more of these gases.

It will be appreciated that, in the event that no solid produce is produced, treatment gas can still be used in the process, with the make-up and addition rate of the treatment gas thus constituting one of the process variables. The make-up and addition rate of the gaseous medium or plasma generating gas can also constitute one of the process variables.

The process is characterized thereby that differing feedstocks can be treated in the process, and the process variables or parameters can be selected to obtain different products. Thus, in one embodiment of the invention, only the solid carbonaceous material may be used as a feedstock to the preheating zone, ie the feedstock consists only of the solid carbonaceous material. The solid carbonaceous material may be selected from coke such as synthetic grade coke, pitch grade coke or petroleum grade coke; waste carbonaceous material such as waste anode material; anthracite; and coal. The process can then be operated to obtain purified carbonaceous material as the solid product, with the components which are gasified in the reaction zone being impurities or undesirable components present in the feedstock material. Instead, the process can be operated to obtain one or more desired gasified or gaseous components are present in the hot gas phase, with any residual solid material being of little or no value. The components present in the gas phase may then be recovered as products.

In another embodiment of the invention, a mixture of the solid carbonaceous material and a solid non-carbon material selected from a metal or metal-containing mineral, eg chromite; a non-metal compound such as an oxide, eg silica oxide, particularly an oxide capable of being converted to a carbide; and a ceramic, may be used as a feedstock to the preheating zone. The process can then be operated to obtain a valuable solid product other than coke.

In yet other embodiments of the invention, the make-up and/or addition rate of the treatment gas and/or the plasma generating gas can be varied or altered to obtain both valuable gaseous components and valuable solid products, in some cases. The treatment gas make-up will be dependent on the particular feedstock that is used, as well as the recovery system used to recover valuable components from the gas phase.

The feedstock may have a purity between 70% and 99.9% (by mass), and more typically between 80% and 99.9% (by mass), so that it then contains between 0.1% and 20% (by mass) impurities. When coke is used as feedstock, or as a component thereof, the impurities are typically present in the form of 1.0% to 1.6% bonded nitrogen, and at least 0.2% sulphur (by mass).

The particle size distribution of the feedstock is typically from 1 mm to 30 mm in diameter or cross-section, preferably from 3 mm to 15 mm.

As stated hereinbefore, the feedstock is heated to a temperature of about 1800° C. or higher, ie the reaction temperature in the reaction zone is not less than about 1800° C. At temperatures below about 1800° C., the removal of impurities such as nitrogen and sulphur from carbonaceous material such as coke is excessively time consuming. The upper limit of the temperature to which the material is heated, is set by the formation of undesirable species in the gas phase. Typically, however, the maximum reaction temperature may be between 1800° C. and 2600° C., when the feedstock consists only of carbonaceous material such as coke. Preferably, the reaction temperature is then at least 2000° C., eg between 2100° C. and 2300° C. Typically, the maximum reaction temperature may be up to 4000° C., when the feedstock comprises a carbonaceous material in admixture with metal oxides, ceramics or halide containing compounds, as hereinbefore described.

Any hot solid product may be cooled down, in the cooling zone, from the temperature to which it has been heated in the reaction zone, eg 2100° C. to 2300° C., to 1000° C. or less, eg to as low as 150° C.

The pretreatment zone, the reaction zone, and the cooling zone may be thus provided in a single vessel or reactor, which may be a vertical shaft non-transfer arc plasma reactor.

The required residence time of the solid material in the reaction zone to obtain a desired conversion is a function of the reaction temperature, and may typically be between 10 minutes and 8 hours, preferably between 30 minutes and 60 minutes, at a reaction temperature of between 1800° C. and 2500° C. Since the reactor is filled with the solid material, the residence time of the material in the reaction zone is controlled by the withdrawal rate of solid product from the cooling zone.

Heat transfer in the reactor is determined by the actual velocity or mass flow rate per unit of cross flow area of the treatment gas through the reactor, the gas temperature and the temperature difference between the gas and the solid material.

The radial temperature profile in the reactor is thus largely determined by the gas mass flux, gas temperature and heat loss to the reactor surface at any vertical position of the reactor. The solid material or phase characteristics, such as voidage, particle size distribution, particle surface area, density, conductivity, temperature and mass flow will also influence this temperature profile. Any reactive combination between the gas and solid material will also affect the temperature profile.

Typically, the mass ratio of the feedstock to the treatment gas is between 1:0.1 to 1:8.

The power input to the plasma generator is typically between 200 kW and 6000 kW, preferably between 600 kW and 3000 kW.

The typical energy usage of the process is between 0.1 MWh/t and 25 MWh/t, eg between 0.7 MWh/t and 1.5 MWh/t, for carbonaceous material. The carbonaceous material may undergo a crystal structure change due to high temperature treatment and the thermal conductivity of the solid material can be increased from typical values of 5 W/mK to more than 20 W/mK, and typically to about 50 W/mK.

The temperature profile of the material in the reaction zone for a specific reactor, is controlled or determined by means of the power input to the plasma generator, the treatment gas composition, the percentage of the treatment gas that is introduced with the plasma flame, the overall treatment gas flow rate through the reaction zone, the characteristics of the solid material particles, the reactor insulation, the reactor diameter profile, the particle mass flow rate, and the reactor height.

If desired, in addition to cooling down any solid product with the treatment gas, further cooling thereof can take place, within the cooling zone and/or outside, eg adjacent, the cooling zone, eg by means of a water cooled extractor.

By means of the treatment gas, energy is thus recovered from the hot solid carbonaceous product. When the treatment gas comprises a relatively inert gas such as nitrogen, it will typically have a purity of at least 97% (by mass). The mass ratio of treatment gas to feedstock material within the reactor, and without any treatment gas recovery, is between 0.6 and 1.5. This indicates that with treatment gas recovery and recycling, the usage ratio of treatment gas to feedstock material may be between 0.01:1 to 0.6:1.

The solid product, when present, is, when the process is a continuous process, continuously extracted from the bottom of the reactor at a predetermined rate, eg at between 0.1 and 10.0 tonnes per hour. The product, which is typically in the form of pellets or particles, is naturally dependent on the feedstock used, the reaction temperature, and the treatment gas. Typically, the product may comprise purified coke, containing no graphite, when the feedstock consists only of impure coke and the reaction temperature is about 1800° C.; purified coke, containing graphite, when the feedstock consists only of impure coke and the reaction temperature is about 2500° C.; activated carbon when the feedstock is coke, anthracite or coal and steam is used as the treatment gas or as part of the gaseous medium; a metal, when the feedstock is a specific metal or mineral/carbon mixture at residence reaction times and temperature; a carbide ceramic, when the feedstock is a specific silicon oxide/carbon/metal mixture.

However, carbonaceous by-products can also be recovered together with the main product from the bottom of the reactor, when the feedstock does not consist only of carbonaceous material. Thus, when the main product recovered is a metal or a ceramic, then a typical carbonaceous by-product which is recovered is purified carbonaceous material.

The gas phase withdrawn from the reactor typically includes components such as CN, HCN, $CCl_4$, $CF_4$, $C_2F_4$, CO, $H_2$ or $C_xH_y$ (where x and y are integers), or combinations thereof.

The gas phase withdrawn from the reactor, is the effluent gas, can be recycled after cooling and cleaning thereof. This will reduce the make-up or pure treatment gas requirement, eg to approximately 0.1 kg fresh gas feed per kg of fresh feedstock into the reactor.

The slow moving bed within the reactor results in a minimal abrasion effect, and the feedstock particles generally do not decrease significantly in size. The amount of fines lost to the gas phase is typically less than 3% (by mass).

According to a second aspect of the invention, there is provided an installation for treating solid carbonaceous material, which comprises a vertical shaft non-transfer arc plasma reactor comprising an upper preheating zone, an intermediate reaction zone in which at least one non-transfer arc plasma generator or reactor is located, and a lower cooling zone;

solids feed means for feeding a feedstock comprising solid carbonaceous material, into the preheating zone;

gas phase withdrawal means for withdrawing a gas phase from the preheating zone;

solid product withdrawal means for withdrawing a solid product from the cooling zone; and treatment gas feed means for feeding a treatment gas into the cooling zone.

It will be appreciated that there will not usually be a clear demarcation, within the reactor, of the various zones which can, in use, shift within the reactor depending on the control parameters; however, during operation of the reactor, the three zones will be present within the reactor with there thus being an overlap between adjacent zones. Additionally, in use, the fixed or moving bed of feedstock material will thus fully occupy the cooling zone, the reaction zone and the preheating zone; however, if desired, a head space may be provided in the preheating zone to facilitate disengagement of the hot gas phase from the fresh feedstock material at the top of the bed.

In view of the high temperatures present in the reaction zone of the reactor in use, there may be provided, in at least the reaction zone of the reactor, a heat resistant refractory lining of carbon; graphite; ceramic; zirconium, eg zirconium oxide; a carbide; or a metal such as molybdenum or tungsten. The thickness of the lining may be from 1 mm to 1 m, depending on the reaction zone and the process design parameters. Additionally, the chemical and mechanical properties of the lining are selected to be compatible with the feedstock, the treatment gas, the gas phase, the plasma generating gas, etc.

The installation may include a hopper arrangement or the like for introducing the feedstock into the top of the reactor. The hopper arrangement can then form part of the reactor, ie may be located immediately above the preheating zone.

Other aspects of the installation and the reactor, such as the non-transfer arc plasma generator, may be as hereinbefore described with reference to the process of the first aspect of the invention.

The invention will now be described by way of the enclosed drawing and the subsequent non-limiting postulated examples. The reference numerals referred to in the examples are those indicated in the drawing.

BRIEF DESCRIPTION OF THE DRAWING

The drawing represents a simplified flow diagram of a process according to the invention for treating solid carbonaceous material.

DETAILED DESCRIPTION OF PREFERRED EMBODIMENTS

In the drawing, reference numeral 10 generally indicates a process according to the invention for treating solid particulate carbonaceous material.

The process 10 includes a vertical shaft non-transfer arc plasma reactor 12. The reactor 12 has an upper preheat zone 14, an intermediate reaction zone 16 and a lower cooling/recovery zone 18, as hereinbefore described.

A feed line 20, for feeding a solid particulate feedstock into the top of the reactor 12, leads from a hopper 22, with a make-up line 24 leading into the hopper 22.

A hot gas phase withdrawal line 26 leads from the top of the reactor 12. Optional hot gas phase withdrawal lines 28 and 30 lead from the preheat zone 14 and reaction zone 16 respectively.

A solids product withdrawal line 32 leads from the bottom of the reactor.

A treatment gas feed line 34 leads into the bottom of the reactor 12, ie into the zone 18. Optional treatment gas feed lines 36, 38 lead into the reaction zone 16 and preheating zone 14 respectively.

At least one non-transfer arc plasma generator 40 is located in the reaction zone 16, with an electricity supply 42 leading to the generator 40. In use, a non-transfer arc plasma 44 is generated in the reaction zone 16 by the plasma generator 40.

It will be appreciated that the plasma generator 40 is of known construction, and functions in known fashion. Thus, it typically comprises an elongate cathode (not shown) located axially within a cylindrical anode (not shown) with the anode and cathode being connected to the electrical supply 42. The anode is provided with a water cooled nozzle (not shown) through which the plasma arc 44 projects. A gas supply (not shown) is provided between the anode and cathode. The plasma arc 44 is generated when a medium voltage electrical power, eg 900 V, is supplied to the anode and cathode, thereby producing an electric current. Simultaneously, gas flowing between the anode and the cathode is heated to an excess of 3000° C. by the electric current passing between the anode and cathode.

At this temperature, the molecules of the gas are split into atoms, which become ionized and electrically conducting, ie form a plasma. A variety of gases, such as oxygen, inert gases, etc can be used to produce the plasma, ie can be used as gaseous medium or plasma generating gas. The electrical conductivity of the plasma leads to the creation of an elongated electric arc which is needed to heat the gas further, thereby producing the plasma arc or flame 44.

The product withdrawal line 32 leads to a cooling/extraction stage 48, with a final product withdrawal line 50 leading from the stage 48. An optional treatment gas line 52 leads from the line 34 to the stage 48. An optional treatment gas line 54 also leads to the hopper 22.

It will be appreciated that, if desired, the hopper 22 can be incorporated into the reactor 12, and will then be located above the preheating zone 12. Similarly, if desired, the cooling/extraction stage 48 can be incorporated into the reactor 12, and will then be located below the cooling/recovery zone 18.

In use, a solid particulate feedstock, typically consisting only of carbonaceous material such as coke, or comprising a mixture of carbonaceous material and a metal or an oxide, is introduced into the top of the reactor 12, ie into the preheating zone 14, along the lines 24, 20 and the hopper 22.

The fresh feedstock material thus introduced into the reactor 12, is introduced into the top of a bed 45 of the material which fully occupies the inside of the reactor 12.

In the preheating zone 14, the bed of material is preheated, by means of hot gas phase from the reaction zone 16.

Since fresh feedstock is continuously introduced into the top of the reactor 12, while purified product is continuously withdrawn from the bottom of the reactor 12, the bed 46 continuously moves downwardly through the reactor. The preheated material thus passes from the preheating zone 14 to the reaction zone 16, where it is subjected to further heating with the plasma arc 44. This results in impurities present in the carbonaceous material, being gasified so that they form part of the gaseous phase, thereby being removed from the solid carbonaceous or other feedstock material.

The thus treated material, ie purified product, then passes from the reaction zone 16 through the cooling/heat recovery zone 18, where it is cooled with treatment gas that enters through the line 34. The purified product is withdrawn along the flow line 32 and subjected to further cooling in the cooling/extraction stage 48, before being finally removed along the flow line 50.

In the examples, which are, as hereinbefore stated, based on the process 10, all percentages are given on a mass basis.

EXAMPLE 1

Calcined pitch coke from Sasol Carbo-Tar (trademark of SASOL LTD) as feedstock and nitrogen as treatment gas. Production of low nitrogen, low sulphur and low ash graphitized coke.

Calcined pitch coke (from Sasol Carbo-Tar) with 98% purity and particle sizes of 3 mm to 15 mm is fed, along line 20, into the top of the reactor 12 by means of the hopper/feeder 22. This feedstock material contains 1.0 to 1.6% bonded nitrogen and at least 0.2% sulphur. The material is present as a bed 46 in the reactor. The reactor 12 has a 0.7 m to 1.3 m inner diameter, and the solid particulate feedstock material moves slowly downwardly continuously through the zones 14, 16, 18 of the reactor, at a rate of 40 mm per minute to 70 mm per minute. At the top of the reactor 12, ie in the preheating zone 14, the feedstock particles are preheated by means of hot nitrogen (gas phase) flowing upwards through the bed 46. In the reaction zone 16, the temperature of the particles is increased by means of the non-transfer plasma torches 40, whose total or combined electrical energy input can vary between 600 kW and 3000 kW. The particles are heated up to reaction temperatures between 1800° C. and 2600° C. in the reaction zone 16, with impurities therein (nitrogen and sulphur) being gasified and passing into the gas phase, while the pitch coke is purified. The residence time of a particle in this high temperature zone is between 10 minutes and 60 minutes. Below the reaction zone, ie in the cooling/recovery zone 18, energy is recovered from the purified coke by the upward flow of low temperature nitrogen, which enters along the flow line 34. The nitrogen has a purity of at least 97%. The mass ratio of nitrogen to coke, without any nitrogen recovery, is between 0.6:1 and 1.4:1. The bulk of the nitrogen is introduced in the zone 18. The rest of the nitrogen is introduced into the reactor 12 by being used as the plasma generating gas in the plasma torches. The final cooling of the product takes place in the cooling/extraction section 48, using a water cooled extractor. The solid purified carbonaceous product is continuously extracted at a predetermined rate of between 1 and 3 tonnes per hour. The typical chemical analysis of the product is the following:

| Chemical compound | Mass % |
|---|---|
| Carbon | Above 99.5 |
| Sulphur | Below 0.05 |
| Nitrogen | Below 0.05 |
| Moisture (after 7 days in atmosphere) | Below 0.07 |
| Hydrogen | Below 0.05 |
| Ash content | Below 0.3 |

If the highest reaction temperature exceeds 2400° C., the product is graphitized. The thermal conductivity of the material changes. The typical energy usage of this process is between 0.7 MWh per tonne and 1.8 MWh per tonne. The gas phase which is withdrawn along the line 26 comprises mainly nitrogen with small amounts of cyanide type products such as $C_2N_2$ and CN etc, and sulphur compounds such as $CS_2$. These products are only produced in very small amounts (<0.1%) when the reaction temperature exceeds 2300° C. The nitrogen which is withdrawn along the line 26, can be recycled after cooling and cleaning. This reduces the make-up nitrogen to below 0.1 kg nitrogen per kg of coke. The slow moving bed has a minimum abrasion effect and the particles do not decrease in size. The amount of fines lost in the gas phase is less than 3%. The total yield of the process is therefore above 95%.

EXAMPLE 2

High sulphur calcined pitch coke as feedstock, and nitrogen as treatment gas. Production of low sulphur coke.

Example 1 is repeated, but with the following differences: Calcined pitch coke with a purity of at least 95% and particle sizes of 3 mm to 15 mm is used as feedstock material. This material contains 0.1% to 0.8% bonded nitrogen and at least 2% sulphur. The typical chemical analysis of the product is the following:

| Chemical compound | Mass % |
|---|---|
| Carbon | Above 99.5 |
| Sulphur | Below 0.05 |
| Nitrogen | Below 0.05 |
| Moisture (after 7 days in atmosphere) | Below 0.07 |
| Hydrogen | Below 0.05 |
| Ash content | Below 0.3 |

As in Example 1, if the highest reaction temperature exceeds 2400° C., the product is graphitized. The thermal conductivity of the solid compacted material is increased to more than 50 J/msK. The typical energy usage of this process is between 0.7 MWh per tonne and 1.8 MWh per tonne. The gas phase comprises mainly nitrogen with small amounts of halogen gases, chlorine, $SiCl_4$, $TiCl_4$, $FeCl_2$, sulphur containing gases and cyanide type products such as $C_3N_2$ and CN etc. These products only form in small amounts (<0.1%) when the reaction temperature exceeds 2300° C. The nitrogen can be recycled after cooling and cleaning. This reduces the make-up nitrogen to below 0.1 kg nitrogen per kg of coke. The slow-moving bed has a minimum abrasion effect and the particles do not decrease in size. The amount of fines lost in the gas is less than 3%. The total yield of the process is therefore above 90%.

EXAMPLE 3

High ash containing calcined pitch coke as feedstock, and a nitrogen and halogen containing gas mixture as the treatment gas. Production of low ash containing coke.

Example 1 is repeated, but with the following differences: High ash containing calcined pitch coke with a purity of at least 80%, and particle sizes of 3 mm to 15 mm is used as feedstock material. This material contains at least 1% to 10% ash. The particles are heated up to temperatures between 1300° C. and 2600° C. in the reaction zone 16. In the cooling/heat recovery zone 18, energy is recovered from the particles by the upward flow of a treatment gas comprising a mixture of nitrogen and chlorine containing compounds such as carbon tetrachloride or chlorine. The chlorine compounds react with the ash at the temperatures in the reaction zone 16 to produce products such as silicon tetrachloride, iron chloride and titanium chloride. The concentration of the chlorine compound is calculated using between 1 and 3 times the stoichiometric amount of ash in the feedstock. These chlorides are gaseous at these temperatures and concentrations, and form part of the gas phase that is withdrawn along line 26. These chloride products can be recovered and/or scrubbed from the gaseous stream before the rest of the nitrogen is released or recycled. The mass ratio of nitrogen to coke, without nitrogen recovery, is between 0.6:1 and 1.4:1. The bulk of the nitrogen is used in the plasma torches.

The typical chemical analysis of the product is the following:

| Chemical compound | Mass % |
|---|---|
| Carbon | Above 97 |
| Sulphur | Below 0.5 |
| Nitrogen | Below 0.5 |
| Moisture (after 7 days in atmosphere) | Below 0.07 |
| Hydrogen | Below 0.5 |
| Ash content | Below 3 |

As in Example 1, if the highest reaction temperature of treatment exceeds 2400° C., the product is graphitized. The thermal conductivity of the material is increased to more than 50 J/msK. The typical energy usage of this process is between 0.7 MWh per tonne and 1.5 MWh per tonne. The gas phase comprises mainly nitrogen with small amounts of sulphur containing gases and cyanide type products such as $C_2N_2$ and CN etc. These products only form in small amounts (<0.1%) when the reaction temperature exceeds 2300° C. The nitrogen can be recycled after cooling and cleaning. This reduces the make-up nitrogen to below 0.1 kg nitrogen per kg of coke. The slow-moving bed has a minimum abrasion effect and the particles do not decrease in size. The amount of fines lost in the gas is less than 3%. The total yield of the process is therefore above 80%.

EXAMPLE 4

Calcined pitch coke as feedstock, and a fluorine containing gas as the treatment gas. Production of Tetrafluoroethylene High purity calcined coke with a purity of at least 98%, and particle sizes of 3 mm to 15 mm is used as feedstock. The process in this example is a semi-batch process. After each loading of the reactor 12, the carbon is heated in the preheating zone 14 and in the reaction 16 to temperatures above 2300° C., with only fluorine containing treatment passing gas through the packed bed. The hot carbon fluoride gas is quenched on withdrawal from the reactor 12, to temperatures below 500° C., at a rate above $10^5$ Kelvin per second. In the reaction zone 16, the temperature of the particles is increased using the non-transfer plasma torches 40 running preferably on fluorine containing gases. The total power consumption of the plasma torches can vary between 100 kW and 3000 kW. The particles are heated up to temperatures between 2300° C. and 4000° C. in the reaction zone. The particles in the high temperature reaction zone react with the fluorine containing gases, and become smaller with time. Below the reaction zone, energy is recovered from the particles in the zone 18, by the upward flow of fluorine containing compounds such as carbon tetrafluoride or fluorine. The use of fluorine as one of the treatment gases is advantageous because it releases energy during the reaction with carbon. This energy reduces the total energy needed for the process. The carbon fluoride gaseous products, comprising mainly carbon tetrafluoride, tetrafluoroethylene, hexafluoroethane and hexafluoropropylene, are recovered from the gas phase withdrawn along line 26 using normal separation methods such as distillation. The molar ratio of carbon to fluorine is between 1:0.5 and 500:1. Higher concentrations of fluorine result in fast reactions and a quick reduction in bed height. The unreacted particles containing mostly ash will accumulate in the bottom or will be lost as fly ash. The ash can be cleaned from the bottom part of the reactor once a day. The typical chemical analysis of the gaseous product is the following:

| Chemical compound | Mass % |
|---|---|
| Carbon tetrafluoride | About 45 |
| Tetrafluoroethylene | About 45 |
| Hexafluoroethane | About 6 |
| Hexafluoropropylene | About 4 |

The typical energy usage of this process is between 1 MWh per tonne and 15 MWh per tonne of fluoride gas. Some of the carbon fluoride gases can be recycled. The total yield of the process is above 90%.

EXAMPLE 5

Calcined pitch coke as feedstock, and a hydrogen and nitrogen containing gas mixture as the treatment gas. Production of hydrogen cyanide (HCN).

High purity calcined coke with a purity of at least 98%, and particle sizes of 3 mm to 15 mm, is used as feedstock material. The process in this example is a semi-batch process. After each loading of the reactor 12, the carbon is heated in the preheating zone 14 and reaction zone 16 to temperatures between 1600° C. and 4000° C., with hydrogen and nitrogen containing treatment gas mixture passing through the packed bed. The cyanide containing gas is quenched on withdrawal from the reactor 12, to temperatures below 500° C. at a rate above $10^2$ Kelvin per second. In the reaction zone, the temperature of the particles is increased using the non-transfer plasma torches 40 running on nitrogen and/or nitrogen/hydrogen containing gases. The total power consumption of the plasma torches can vary between 100 kW and 3000 kW. The particles are heated up to temperatures between 1600° C. and 4000° C. in the reaction zone. The particles in the high temperature reaction zone react with the hydrogen and nitrogen in the treatment gas mixture, and become smaller with time. Below the reaction zone, energy is recovered from the particles in the zone 18 by the upward flow of nitrogen and/or hydrogen containing gases. The gas phase which is withdrawn along line 26 comprises mainly hydrogen cyanide and acetylene, and these gases are recovered from the gaseous nitrogen using normal separation methods such as condensation, dissolving in liquids and distillation. The molar ratios of carbon to nitrogen and carbon to hydrogen are between 1:0.3 and 1:500. Higher concentrations of nitrogen and hydrogen result in rapid reaction and a quick reduction in bed height.

The unreacted particles containing mostly ash will accumulate in the bottom or will be lost as fly ash. The ash can be cleaned from the bottom part of the reactor once a day. The typical chemical analysis of the gaseous product is the following:

| Chemical compound | Mass % |
| --- | --- |
| Nitrogen | About 78 |
| Hydrogen cyanide | About 15 |
| Acetylene | About 5 |
| Hydrogen | About 2 |

The typical energy usage of this process is between 5 MWh per tonne and 25 MWh per tonne of cyanide gas. The total carbon conversion of the process is above 90%.

EXAMPLE 6

Pellets of Chromite ($FeCr_2O_4$)/carbon mixture are used as feedstock, and carbon monoxide as treatment gas. Production of ferrochromium and carbon monoxide gas.

Example 1 is repeated, but with the following differences: Pellets of a chromite ($FeCr_2O_4$)/carbon mixture with particle sizes of 3 mm to 15 mm are used as feedstock. The particles are preheated in the zone 14 by hot carbon monoxide flowing upwardly through the bed 46. The non-transfer plasma torches 40 run on carbon monoxide gas. The total power consumption of the plasma torches 40 can vary between 600 kW and 3000 kW. The particles are heated up to temperatures between 1200° C. and 2000° C. in the reaction zone 16. The residence time of a particle in this high temperature reaction zone is between 10 minutes and 300 minutes, whereafter it forms a metal sponge with high surface area. In the zone 18, energy is recovered from the sponge particles by the upward flow of low temperature carbon monoxide. This gas also pacifies the sponge by adsorbing on the reactive sites. The sponge can then be handled without spontaneous ignition. The final cooling of the solid sponge ferrochromium products takes place in the cooling/extraction selection 48 by using a water-cooled extractor. The typical chemical analysis of the product is the following:

| Chemical compound | Mass % |
| --- | --- |
| Ferrochromium | About 95 |
| Carbon | Below 5 |

If the highest reaction temperature exceeds 1800° C., the product will melt, and the process extraction system has to be changed to handle a liquid. The typical energy usage of this process is between 0.7 MWh per tonne and 1.5 MWh per tonne solid product. The gas phase which is withdrawn along the flow line 26 comprises mainly carbon monoxide. The carbon monoxide can be recycled after cooling and cleaning, and the rest of the carbon monoxide production can be sold as a product. The slow-moving bed has a minimum abrasion effect and the particles do not decrease in size. The amount of fines lost in the gas phase is less than 3%.

EXAMPLE 7

Pellets of a Silicon Dioxide ($SiO_2$)/carbon mixture are used as feedstock, and carbon monoxide as treatment gas. Production of silicon carbide and carbon monoxide gas.

Example 1 is repeated, but with the following differences: Pellets of a silicon dioxide ($SiO_2$)/carbon mixture with particle sizes of 3 mm to 15 mm are used as feedstock material. The particles are preheated in the zone 14 by hot carbon monoxide flowing upwardly through the bed 46. The non-transfer plasma torches run on carbon monoxide gas. The total power consumption of the plasma torches can vary between 600 kW and 3000 kW. The particles are heated up to temperatures between 1800° C. and 3500° C. in the reaction zone 16. The residence time of a particle in this high reaction temperature zone is between 10 minutes and 300 minutes. In the zone 18, energy is recovered from the particles by the upward flow of low temperature carbon monoxide as treatment gas. The final cooling of the solid products takes place in the cooling/extraction section 48. The typical chemical analysis of the solid product is the following:

| Chemical compound | Mass % |
| --- | --- |
| Silicon carbide | About 95 |
| Carbon | Below 5 |

If the highest temperature exceeds 2700° C. and if the contact time exceeds 200 minutes at the highest temperature, the product will be further reduced and will form molten silicon. In this case the process extraction system has to be changed to handle a hot liquid. The typical energy usage of this process is between 0.7 MWh per tonne and 15 MWh per tonne solid product. The gas phase which is withdrawn along the flow line 26, comprises mainly carbon monoxide. The carbon monoxide can be recycled after cooling and cleaning and the rest of the carbon monoxide production can be sold as a product. The slow-moving bed has a minimum abrasion effect and the particles do not decrease in size. The amount of fines lost in the gas phase is less than 3%.

By controlling the temperature profile throughout the reactor 12, the process of the invention can be controlled in that the treatment gas flow rate, treatment gas composition, product particle size and residence time in the reactor, can be manipulated. Additionally, energy consumption is reduced, as compared to known processes for purifying coke. Additionally, the present invention overcomes, or at least reduces, disadvantages of known coke purification methods such as temperature limitations, and non-uniform product quality, and additionally ensures optimum removal of nitrogen and sulphur impurities, to obtain an ultra-pure carbonaceous product.

The invention thus involves the use of thermal plasma technology, in a continuous or batch process at elevated temperatures, to purify a solid feedstock consisting of, or including, carbonaceous material, rendering a sufficiently pure solid product for most end uses. Constant process temperatures in excess of 2000° C. can be used, and excellent yields are obtained due to the inert atmosphere in the reactor. Additionally, since non-transfer plasma arc technology is used, no feed preheating is required outside of the reactor 12, resulting in limited energy losses from the plasma. The slow moving bed also ensures that product degradation is minimized.

The invention further involves the use of thermal plasma technology in a continuous or batch process at elevated temperatures to produce gaseous compounds comprising of carbon/nitrogen, carbon/fluoride and carbon/chloride compounds.

The process temperature can be controlled accurately resulting in excellent product yield.

The preheating of solids occurs in situ and thus decreases the energy requirements required for the production of a unit of gaseous product.

The contact time between the heated (hot) gas and the heated (hot) solid particles can be controlled to ensure that thermodynamic equilibrium is maintained. This enhances the conversion efficiency and process control.

What is claimed is:

1. A process for treating solid carbonaceous material, which process comprises generating a non-transfer arc plasma flame by means of a non-transfer arc plasma generator or torch located in a high temperature reaction zone and comprising an anode and a cathode between which an arc is generated while a gaseous medium passes between the cathode and the anode, with the gaseous medium being heated by the arc to a temperature such that molecules of the gas split into atoms which become ionized and electrically conducting, with the non-transfer arc generated plasma flame thus comprising the hot ionized gaseous medium or plasma and an elongate electric arc inside the plasma;

heating, in the reaction zone, the solid carbonaceous material to a temperature of from about 1800° C. to 4000° C., thereby causing components of the carbonaceous material to be gasified;

separating, as a hot gas phase, the gasified components from any residual solid material; and withdrawing said any residual solid material from the reaction zone.

2. A process according to claim 1, wherein the plasma generator has a power input of between 200 kW and 6000 kW.

3. A process according to claim 1, wherein the solid carbonaceous material is in particulate form, and is present in the reaction zone in the form of a bed which passes continuously through the reaction zone.

4. A process according to claim 3, wherein the bed of solid carbonaceous material passes continuously through the reaction zone in a vertically downward direction, with fresh solid particulate carbonaceous material being added continuously to the top of the bed, and the withdrawal of the residual solid material, when present, being effected continuously from the bottom of the bed.

5. A process according to claim 4, which includes adding fresh solid particulate carbonaceous material to a preheating zone located above the reaction zone, and heating the carbonaceous material in the preheating zone by contacting it with the hot gas phase from the reaction zone.

6. A process according to claim 5, wherein the addition of the fresh solid particulate carbonaceous material to the top of the bed is at such a rate that the bed moves through the reaction zone at a rate of from 10 mm/min to 90 mm/min.

7. A process according to claim 5, which includes cooling any residual solid material in a cooling zone below the reaction zone, with the cooling being effected by contacting the hot residual solid material with a treatment gas which enters the cooling zone, cools down the hot residual solid material while it is heated, passes upwardly from the cooling zone into and through the reaction zone, and thereafter into and through the preheating zone, with the hot gas phase then comprising spent or used treatment gas, gasified components from the solid carbonaceous material, and any gaseous products formed in the reaction zone.

8. A process according to claim 7, wherein at least a portion or component of the gaseous medium of the non-transfer arc generated plasma flame is treatment gas.

9. A process according to claim 7, wherein only the solid carbonaceous material is used as a feedstock to the preheating zone, and is selected from coke, waste carbonaceous material, anthracite and coal, with the temperature to which the solid carbonaceous material is heated being from 2000° C. to 2600° C.

10. A process according to claim 9, in which purified carbonaceous material is obtained as a solid product, with the components which are gasified in the reaction zone being impurities or undesirable components present in the feedstock material.

11. A process according to claim 9, in which one or more desired gasified or gaseous components are present in the hot gas phase, with any said residual solid material being of little or no value, and with the components present in the gas phase being recovered, as products.

12. A process according to claim 7, wherein a mixture of the solid carbonaceous material and a solid non-carbon material selected from a metal or metal-containing mineral, a non-metal compound, and a ceramic, is used as a feedstock to the preheating zone, with a valuable solid product other than coke being obtained, and with the temperature to which the feedstock mixture is heated being from 2000° C. to 4000° C.

13. A process according to claim 9, wherein the feedstock has a purity between 80% and 99,9% (by mass), so that it contains between 0,1% and 20% (by mass) impurities.

14. A process according to claim 9, wherein the feedstock particles have a particle size distribution of from 1 mm to 30 mm in diameter or cross-section.

15. A process according to claim 7, wherein the treatment gas is selected from: an inert gas selected from argon, helium and neon; nitrogen as a relatively inert gas; oxygen as a more reactive gas; superheated steam; a hydrogen-carbon monoxide mixture; a halogen selected from chlorine or fluorine; and a mixture of two or more of these gases.

16. A process according to claim 7, which includes a vertical shaft non-transfer arc plasma reactor, with the preheating zone, the reaction zone, and the cooling zone being provided in the vertical shaft non-transfer arc plasma reactor.

17. An installation for treating solid carbonaceous material, which comprises a vertical shaft non-transfer and plasma reactor comprising an upper preheating zone, an intermediate reaction zone in which at least one non-transfer arc plasma generator or reactor is located, and a lower cooling zone;

solids feed means for feeding a feedstock comprising solid carbonaceous material, into the preheating zone;

gas phase withdrawal means for withdrawing a gas phase from the preheating zone;

solid product withdrawal means for withdrawing a solid product from the cooling zone; and treatment gas feed means for feeding a treatment gas into the cooling zone.

18. An installation according to claim 17 wherein there is provided, in at least the reaction zone of the reactor, a heat resistant refractory lining of carbon, graphite, ceramic, zirconium, a carbide, or a metal, with the thickness of the lining being from 1 mm to 1 m.

* * * * *

UNITED STATES PATENT AND TRADEMARK OFFICE
CERTIFICATE OF CORRECTION

PATENT NO.    : 6,521,003 B2
DATED         : February 18, 2003
INVENTOR(S)   : Jacobus Swanepoel et al.

It is certified that error appears in the above-identified patent and that said Letters Patent is hereby corrected as shown below:

<u>Title page,</u>
Item [73], Assignee, "Thermiron" should read -- Thermtron --.

Signed and Sealed this

Twenty-second Day of April, 2003

JAMES E. ROGAN
*Director of the United States Patent and Trademark Office*